INVENTOR
CECIL JOHN WAYMAN
BY Kirchstein, Kirchstein & Ottinger,
ATTORNEYS

INVENTOR
CECIL JOHN WAYMAN
BY Kurchstein, Kirschstein & Ottinger
ATTORNEYS

INVENTOR
CECIL JOHN WAYMAN
BY Kirschstein, Kirschstein & Ottinger
ATTORNEYS

INVENTOR
Cecil John Wayman
BY
[signature]
ATTORNEYS

INVENTOR
CECIL JOHN WAYMAN
BY Kirchstein, Kirchstein & Ottinger
ATTORNEYS

INVENTOR
Cecil John Wayman
BY
Kurtzlein, Kurtzlein & Ottinger
ATTORNEYS

INVENTOR
Cecil John Wayman
BY Kinzer, Kinzer & Ottinger
ATTORNEYS

INVENTOR
CECIL JOHN WAYMAN
BY Kinderton, Kinderton + Ottinger
ATTORNEYS

Sept. 14, 1965 C. J. WAYMAN 3,206,738
ELECTRICAL POSITION-ENCODING APPARATUS AND SYSTEMS
INCLUDING SUCH APPARATUS
Filed Jan. 31, 1962 10 Sheets-Sheet 9

INVENTOR
Cecil John Wayman
BY Kinzlinger, Kinzlinger & Ottinger
ATTORNEYS

INVENTOR
CECIL JOHN WAYMAN
BY Kinzler, Kinzler & Ottinger
ATTORNEYS

United States Patent Office 3,206,738
Patented Sept. 14, 1965

3,206,738
ELECTRICAL POSITION-ENCODING APPARATUS AND SYSTEMS INCLUDING SUCH APPARATUS

Cecil John Wayman, Stanmore, Middlesex, England, assignor to The General Electric Company Limited, London, England

Filed Jan. 31, 1962, Ser. No. 170,155
Claims priority, application Great Britain, Feb. 1, 1961, 3,905/61, 3,906/61
23 Claims. (Cl. 340—347)

This invention relates to electrical position-encoding apparatus and systems including such apparatus.

According to one aspect of the present invention electrical position-encoding apparatus comprises: a variable-reluctance transformer that comprises a primary winding, a plurality of secondary windings, and a pair of toothed ferromagnetic cores that are of different tooth-pitch and one of which is movable relative to the other to vary inductive coupling between the primary and secondary windings, there being, owing to the different tooth-pitches of the cores, a multiplicity of cycles of variation of inductive coupling between the primary and secondary windings throughout a multiplicity of consecutive ranges of movement of said one core; and circuit means for responding to signals induced in secondary windings when the primary winding is excited with alternating current to supply a plurality of output signals that provide a digital representation of the position of said one core within any said range, the circuit means including means for deriving from the signals induced in the secondary windings a pair of signals which have amplitudes that vary cyclically at the same rate through said ranges, and an amplitude-comparator for effecting a comparison between the amplitudes of said pair of signals and for supplying an output signal, which signal is one of said output signals, that has a digital value that is dependent upon the result of the comparison.

The variable-reluctance transformer may comprise a toothed ferromagnetic stator, a primary winding on the stator, a plurality of secondary windings that embrace different groups of teeth of the stator, and a toothed ferromagnetic rotor that is arranged for rotation relative to the stator such as to vary inductive coupling between the primary winding and each secondary winding, the rotor and stator having different tooth-pitches so that there is a multiplicity of cycles of variation of said inductive coupling when the rotor is rotated through an angle not exceeding 360 degrees.

The accuracy with which the position of a movable member is represented by a system including position-encoding apparatus, that is to say the resolution of the system, can be increased by coupling a second position-encoding apparatus to the movable member through step-up gearing. In this case the first position-encoding apparatus provides a "coarse" digital representation of the position of the movable member, to the extent that this representation is characteristic of the particular range of a multiplicity of ranges of position within which the position lies. On the other hand, the second position-encoding apparatus provides a "fine" digital representation of the position, to the extent that this representation is characteristic of the position of the movable member within the range represented by the coarse representation.

Although the use of "coarse" and "fine" position-encoding apparatuses, such as in the system referred to above, allows a high degree of resolution to be obtained readily, there are disadvantages inherent in the use of the step-up gearing. Firstly, the gearing is required to be of high quality to avoid inaccuracies in the representation provided by the system, and this is a disadvantage both from constructional and economic standpoints.

Secondly, the fact that the gearing is step-up gearing greatly increases the frictional and intertial loading of the system.

It is one of the objects of the present invention to provide a system of the kind for providing a digital representation of the position of a movable member, which system includes "coarse" and "fine" position-encoding apparatuses, but which does not require step-up gearing.

According to another aspect of the present invention an electrical system for providing a digital representation of the position of a movable member comprises: electrical position-encoding apparatus which is arranged to supply electric signals that provide a digital representation of the particular range of a multiplicity of consecutive ranges of position within which said position lies; a variable-reluctance transformer comprising a primary winding, a plurality of secondary windings, and a pair of toothed ferromagnetic cores one of which is mechanically coupled to said member for movement relative to the other core at the same rate as said member and such as to vary inductive coupling between the primary and secondary windings, the pitch of the teeth on the two cores being different so that throughout said multiplicity of ranges of position there are a multiplicity of cycles of variation of the inductive coupling between the primary and secondary windings; and electrical circuit means for supplying electric signals which are derived in dependence upon the amplitudes of signals appearing in said secondary windings, and which provide a digital representation of said position within any said range.

The mechanical coupling between the toothed cores of the variable-reluctance transformer may be a direct mechanical coupling, or may be provided by 1:1 gearing.

In order to ensure that there is coordination between the "coarse" representation provided by said position-encoding apparatus and the "fine" representation provided by the variable-reluctance transformer and its associated circuit means, the circuit means may be arranged to supply to said position-encoding apparatus an electric controlling signal that has a value that changes concurrently with change in position of the movable member from one to a next of said ranges. The position-encoding apparatus in these circumstances is arranged such that there is a change in the digital representation provided by the position-encoding apparatus only in response to change in said value of the controlling signal.

The said position-encoding apparatus may include a position-encoder having a first electrical winding, a plurality of second electrical windings, and a ferromagnetic member for completing a magnetic circuit that links the first winding to portions of the second windings, the ferromagnetic member being mounted for movement relative to the first and second windings and being mechanically coupled to said movable member so as to move relative to the second windings at the same rate as said movable member, the arrangement being such that the combination of those of the second windings which are inductively coupled to the first winding in one predetermined sense is dependent upon the position of the ferromagnetic member relative to the second windings, and therefore, upon the position of said movable member. An electric exciting signal of varying amplitude may be applied to the first winding so that signals which are either in-phase or in anti-phase with the exciting signal, are induced in the second windings, the combination of the second windings in which in-phase signals (or alternatively in which anti-phase signals) appear being representative of the position of the movable member. Alternatively, the exciting signal may be applied to the second windings in turn so that a train of signals that is characteristic of the position of the movable member is induced in the first winding.

According to a feature of the present invention an electrical system for providing a digital representation of the angular position of a shaft, comprises: an electrical shaft-position encoder which has a rotor that is mechanically coupled to said shaft to rotate with, and at the same rate as, the shaft; electrical circuit means which is arranged to derive from the shaft-position encoder a plurality of electric signals which provide a coarse representation of the angular position of the shaft to the extent that they provide a digital representation of the particular angular range of a multiplicity of equal angular ranges within which the shaft-position lies; a variable-reluctance transformer which comprises a primary winding, a plurality of secondary windings, a toothed ferromagnetic stator, and a toothed ferromagnetic rotor that is mechanically coupled to the shaft to rotate with, and at the same rate as, the shaft, the tooth-pitches of the toothed stator and toothed rotor being different and the windings being arranged such that when the toothed rotor is rotated through an angle not exceeding 360 degrees there are, owing to the different tooth-pitches of the toothed stator and toothed rotor, a multiplicity of cycles of variation of the inductive coupling between the primary and secondary windings; and further electrical circuit means for supplying a plurality of electric signals which are derived from signals induced in the secondary windings of the transformer, and which provide a fine representation of the angular position of the shaft to the extent that they provide a digital representation of the angular position of the shaft within the range of which said coarse representation is then respresentative.

According to another aspect of the present invention, an electrical system for providing a digital representation of the angular position of a shaft, comprises: an electrical shaft-position encoder which has a rotor that is mechanically coupled to said shaft to rotate with, and at the same rate as, the shaft; electrical circuit means which is arranged to derive from the shaft-position encoder a plurality of electric signals which provide a coarse representation of the angular position of the shaft to the extent that they provide a digital representation of the particular angular range of a multiplicity of equal angular ranges within which the shaft-position lies; a device, which has a rotor and a stator, for supplying a plurality of signals the amplitudes of which vary cyclically with rotation of the rotor relative to the stator, the rotor being mechanically coupled to the shaft to rotate with, and at the same rate as the shaft, and the arrangement being such that there are a multiplicity of cycles of variation of the amplitudes of the signals supplied by said device when the rotor is rotated through an angle not exceeding 360 degrees; and further electrical circuit means for supplying a plurality of electric signals which are derived from the signals supplied by said device, and which provide a fine representation of the angular position of the shaft to the extent that they provide a digital representation of the angular position of the shaft within the range of which said coarse representation is then representative.

Two electrical systems both including position-encoding apparatus in accordance with the present invention, for providing nine electric ouput signals that are representative in digital form of the angular position of a shaft, will now be described by way of example with reference to the accompanying drawings, in which.

In the first system to be described with reference to FIGURES 1 to 11, the output signals represent the shaft position according to a nine-digit reflected binary cyclic-permuted code (in which consecutive representations of position differ in the value of the digit in one digital place only). The angular position of the shaft is thereby represented by one of five-hundred-and-twelve different nine-digit binary numbers, each of which is characteristic of a respective angular range of 0.703125 degree within a revolution.

Figures 1, 2:
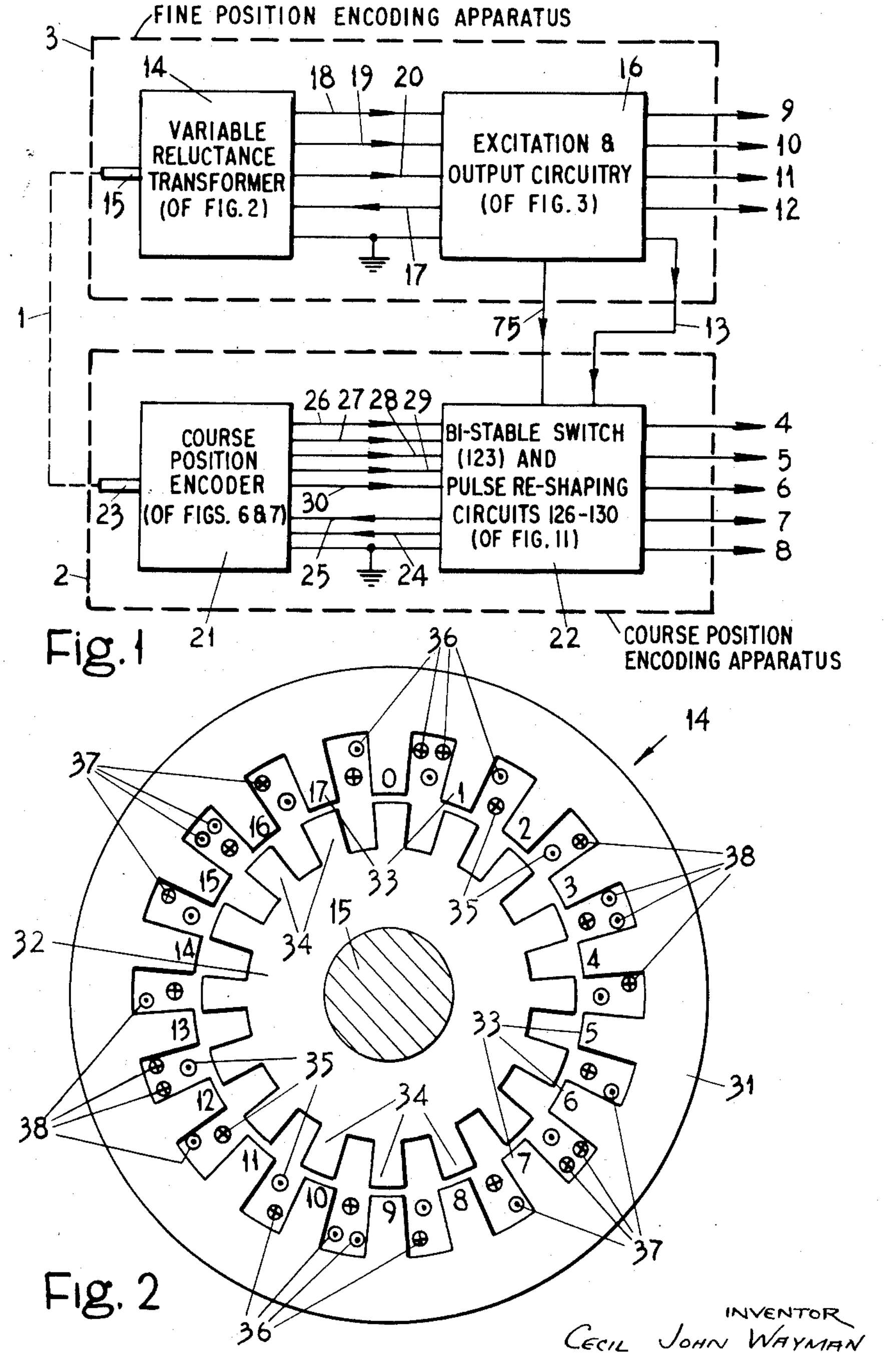
FIGURE 1 is a schematic representation of a first of the two systems.
FIGURE 2 is an end elevation of a variable-reluctance transformer that forms part of the system of FIGURE 1.

Referring to FIGURE 1, the nine output signals are provided by two position-encoding apparatuses 2 and 3 which are referred to as the "coarse" and "fine" position-encoding apparatuses respectively. The coarse position-encoding apparatus 2 supplies via five output leads 4 to 8 five output signals that are respectively representative of the five more significant digits of the appropriate nine digit number, and the fine position encoding apparatus 3 supplies over four output leads 9 to 12 four output signals that are respectively representative of the remaining four lesser significant digits. The five more significant digits represented by the signals on the leads 4 to 8 provide a coarse representation of the angular position of the shaft 1 to the extent that they are together characteristic of the particular one of thirty-two angular ranges of 11.25 degrees within which the angular position of the shaft 1 then lies. The four lesser significant digits represented by the signals on the leads 9 to 12 provide a fine representation of the angular position of the shaft 1 to the extent that they are together characteristic of the angular position of the shaft 1 within any one of the ranges of 11.25 degrees, this group of four digits identifying the angular position of the shaft 1 within the appropriate range of 11.25 degrees to within 0.703125 degree.

In addition to the four output signals, supplied over the leads 9 to 12, the fine position-encoding apparatus 3 supplies over an output lead 13 a fifth output signal which is utilised to control the coarse position-encoding apparatus 2 in such a manner as to obviate error in the representation provided by the system as a whole. The signal on the lead 13 has one of two notional values, "0" and "1," the value changing as the shaft 1 is rotated from one to the next of each range of 11.25 degrees. The coarse position-encoding apparatus 2 is responsive to any change in value of the controlling signal on the lead 13 to effect a change in value of an appropriate one of the five output signals appearing on the leads 4 to 8, so that as the shaft 1 is rotated from one to the next of the thirty-two ranges of 11.25 degrees, the representation provided by the coarse position-encoding apparatus 2 is changed accordingly. This ensures that the representation provided by the coarse position-encoding apparatus 2 is coordinated to the five-hundred-and-twelve ranges of 0.703125 degree as these are defined by the five output signals from the fine position-encoding apparatus 3.

The fine position-encoding apparatus 3 comprises a variable-reluctance transformer 14 that has a shaft 15 which is mechanically coupled directly to the shaft 1, and an excitation-and-output unit 16 for supplying an excitation signal to the variable-reluctance transformer 14 via a lead 17, and for supplying the five output signals to the leads 9 to 13. The unit 16 derives the five output signals from three signals supplied thereto via three leads 18 to 20 from the variable-reluctance transformer 14. The signals appearing on the leads 18 to 20 are in-phase with one another, and have amplitudes that vary cyclically throughout pairs of the ranges of 11.25 degrees of rotation of the shaft 15, that is to say, throughout each of sixteen ranges of 22.5 degrees of shaft rotation. Six signals are derived within the unit 16 by combining the three signals appearing on the leads 18 to 20. The most significant and the second most significant of the five output signals of the fine position-encoding apparatus 3, which two signals appear on the leads 13 and 12 respectively, are derived from a comparison between the amplitudes of respective first and second pairs of the six signals. The comparison between the amplitudes of the first and second pairs of signals yields two auxiliary signals, and the third most significant of the five output signals, which signal appears on the lead 11, is derived by a comparison between the amplitudes of these two auxiliary signals. The amplitude of a third auxiliary signal that is yielded by the latter comparison, is compared with the amplitude of a further signal in order to derive the fourth most significant signal (appearing on the lead 10), said further signal being derived in dependence upon a comparison between the amplitudes of the third pair of said six signals. The comparison between the amplitudes of the third auxiliary and further signals in its turn yields a fourth auxiliary signal, and the least significant of the five output signals, which signal appears on the lead 9, is derived in dependence upon the amplitude of the fourth auxiliary signal relative to a substantially constant unidirectional voltage.

The coarse position-encoding apparatus 2 includes a shaft-position encoder 21 and an excitation-and-output unit 22 for exciting the position-encoder 21 and for supplying the five output signals to the leads 4 to 8. The position-encoder 21, which in its basic form is the same as the position-encoder described with reference to FIGURES 1, 2 and 3 in British patent specification No. 863,027, has a shaft 23 that is mechanically coupled directly to the shaft 1. The unit 22 supplies a train of exciting pulses to the position-encoder 21 via a lead 24 or a lead 25 in dependence upon the value of the signal appearing on the lead 13. In response to the exciting pulses the position-encoder 21 supplies to the unit 22 via five leads 26 to 30, five trains of output pulses that are dependent upon the angular position of the shaft 23. The output pulses are each either of one sense or the other with respect to the exciting pulses in dependence upon the angular position of the shaft 23 and also, in certain circumstances, upon the value of the most significant "fine" output signal appearing on the lead 13. The five output signals of the coarse position-encoding apparatus 2 which appear on the leads 4 to 8, are derived respectively within the unit 22 from the five trains of pulses appearing on the leads 26 to 30.

The construction of the fine and coarse position-encoding apparatuses 3 and 2 will now be described in detail with reference to FIGURES 2 to 11.

Referring in particular to FIGURE 2, the variable-reluctance transformer 14 of the fine position-encoding apparatus 2 has a toothed ferromagnetic stator 31 and a toothed ferromagnetic rotor 32, the rotor 32 being directly coupled to the shaft 15 and thus to the shaft 1 whose position is to be encoded. The stator 31 has the general form of a hollow cylinder with eighteen equally-spaced teeth 33 projecting radially inwards from around its internal circumference. The rotor 32 which is of a generally cylindrical form, is mounted to lie coaxially within the stator 31 and has sixteen equally-spaced teeth 34 which around the circumference of the rotor 32 project radially outwards towards the teeth 33. The teeth 33 and 34 of each of the two sets carried respectively by the stator 31 and rotor 32 have widths that are equal to the widths of the gaps between them. Since the numbers of the teeth 33 and 34 in the two sets are unequal, the pitches of these two sets are unequal also, the tooth-pitch thus being, with rotary cores, the angular pitch. The difference of tooth pitch between stator 31 and rotor 32 gives a cyclic relationship between the positions of the two sets of teeth at any relative position of stator and rotor. In the present case 9 teeth 33 of the stator 31 occupy the same angular extent as 8 teeth 34 of the rotor 32 and thus there are two cycles of this cyclic relationship in one traverse of the stator circumference. Diametrically opposite stator teeth 33 will be in identical phase with regard to position in each of the two cycles. Any combination of rotor and stator teeth numbers in which 2 is the only factor common to both can be seen to provide only two cycles in one stator circumference.

A primary winding 35 and three star-connected secondary windings 36 to 38 are wound on the stator 31. The three secondary windings are positioned on the stator 31 at spacings of one third of one of these cycles of tooth relationship. They are thus essentially distributed over 180° of the stator. However the provision of two such cycles to the stator circumference enables the secondary windings each to be divided into equal and aiding halves positioned diametrically opposite and therefore in similar phase positions in each cycle. More of the available winding space around the stator 31 is thus made use of. The primary winding 35 is wound round each of the eighteen teeth 33, Nos. 0 to 17, so that its sense alternates from one tooth 33 to the next. Each secondary winding 36 to 38 on the other hand is wound round only two pairs of teeth 33. The secondary winding 36 is wound round Nos. 0 and 1 of the teeth 33, and also round the pair of teeth 33 that are diametrically opposite, that is to say, Nos. 9 and 10. The secondary windings 37 and 38 are similarly wound round two diametrically opposite pairs of teeth 33, the winding 37 being wound round Nos. 6 and 7, and Nos. 15 and 16, and the winding 38 being wound round Nos. 12 and 13, and Nos. 3 and 4. Each secondary winding 36 to 38 is wound so that its sense changes between the two teeth 33 of both pairs, and so that the diametrically opposite teeth 33 of the pairs are wound in opposite senses. These three secondary windings 36 to 38, which are of the same sense where they are wound round Nos. 0, 6 and 12 respectively of the teeth 33, are all wound upon the stator 31 in the same manner except insofar as they are displaced from one another by 120 degrees round the stator 31. (In FIGURE 2 the windings 35 to 38 are shown for clarity as passing only once round any tooth 33, the directions in which the windings 35 to 38 are wound round the teeth 33 being indicated by crosses and circles; the crosses and circles indicate the respective directions into, and out of, the plane of the figure.)

Figure 3:
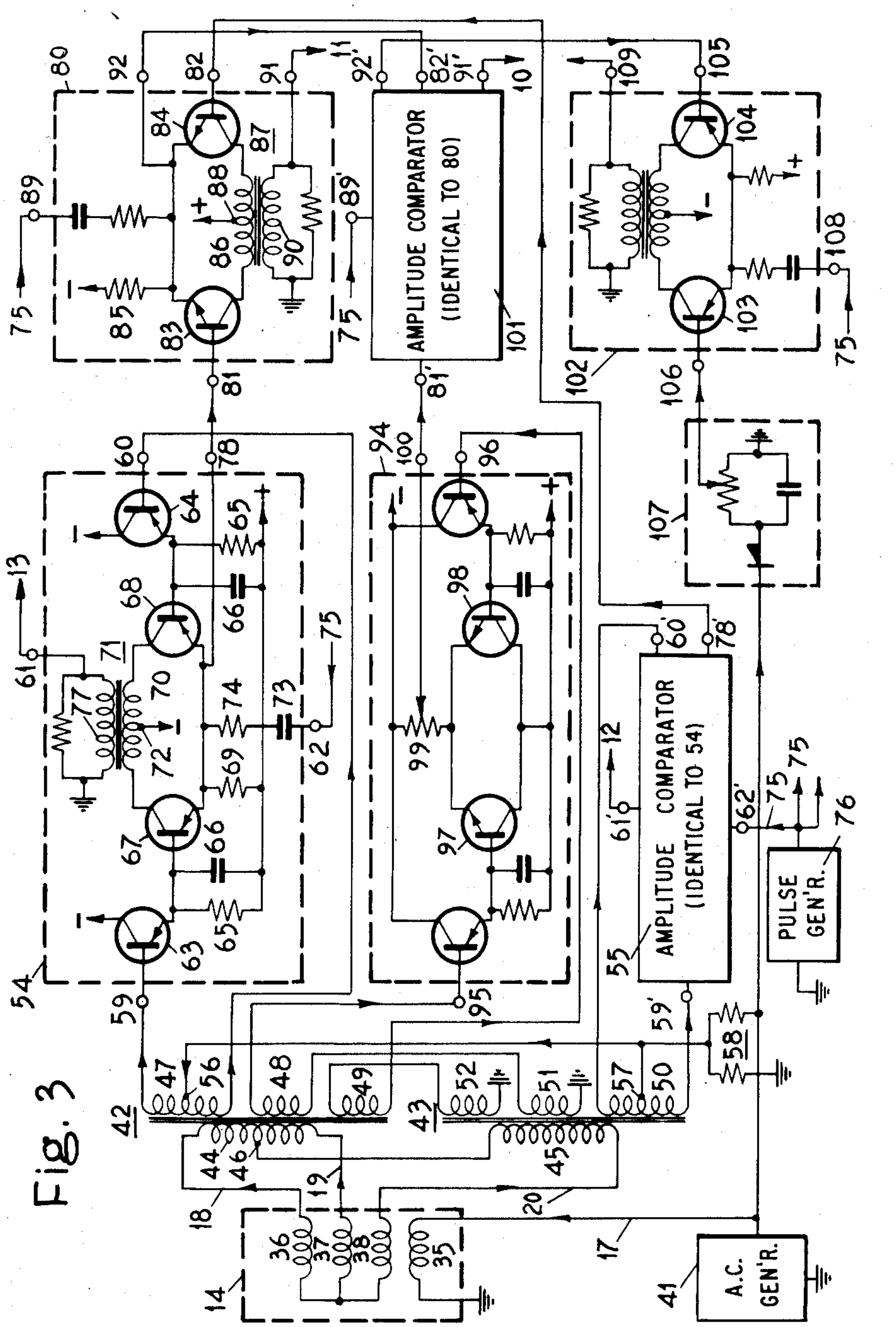
FIGURE 3 is a circuit diagram of "fine" position-encoding apparatus including the variable-reluctance transformer of FIGURE 2.

Referring now in particular to FIGURE 3, an alternating current supply source 41 supplies to the primary winding 35, via the lead 17, alternating current that has a frequency of 2.4 kilocycles per second. The resulting signals induced in each secondary winding 36 to 38 at the respective two diametrically opposite pairs of teeth 33 (FIGURE 2) are additive, the amplitudes of these signals being dependent upon the angular position of the rotor 32 with respect to the stator 31 (FIGURE 2). Rotation of the shaft 1 (FIGURE 1) results in movement of the rotor teeth 34 past the stator teeth 33 (FIGURE 2) and accordingly varies the reluctances of the magnetic circuits linking the secondary windings 36 to 38 to the primary winding 35. The signals induced in the three secondary windings 36 to 38, which signals are in-phase with one another, are therefore amplitude modulated in accordance with rotation of the shaft 1, the modulation components having substantially sinusoidal waveforms. Since there are sixteen rotor teeth 34 (FIGURE 2) the modulation components execute one complete cycle for every sixteenth part of a revolution of the shaft 1, that is, for every 22.5 degrees of rotation. However, since the secondary windings 36 to 38 are spaced by 120 degrees from one another on the stator 31, and there are eighteen stator teeth 33 as opposed to sixteen rotor teeth 34 (FIGURE 2), the modulation components are 120 degrees out of phase with one another as the shaft 1 rotates. Thus within any range of 22.5 degrees of rotation of the shaft 1 the maximum (and minimum) amplitudes of the signals appearing in the three secondary windings 36 to 38 are spaced apart from one another by 7.5 degrees of shaft rotation.

The three secondary windings 36 to 38 are connected via the leads 18 to 20 respectively to two Scott-connected transformers 42 and 43. The secondary windings 36 and 37 are connected to opposite ends of a primary winding 44 of the transformer 42 (the so-called "main transformer" of the Scott-connected pair). The secondary winding 38 on the other hand is connected to one end of a primary winding 45 of the transformer 43 (the so-called "teaser transformer" of the Scott-connected pair), the other end being connected to a centre-tap 46 on the primary winding 44.

The primary winding 45 has $N\sqrt{3}$ turns, where the number of turns of the primary winding 44 is 2N.

The transformers 42 and 43 have sets of three second-windings 47 to 49 and 50 to 52 respectively. The modulation component of the signal induced in each secondary winding 47 to 49 as the shaft 1 is rotated, is in phase quadrature with the signal induced in each secondary winding 50 to 52, in the sense that within any range of 22.5 degrees of rotation of the shaft 1 the maximum (and minimum) amplitudes of the signals are spaced apart from one another by 5.625 degrees of shaft rotation. The amplitudes of the signals induced in the two sets of secondary windings 47 to 49 and 50 to 52 are directly proportional to the values of cos $(16\theta)$ and sin $(16\theta)$ respectively, where $\theta$ is the angular displacement of the shaft 1 from a datum angular position. These signals effectively divide each revolution of the shaft 1 into a system of sixteen sections of 22.5 degrees measured from the datum angular poistion.

The five output signals of the fine position-encoding apparatus 14 (supplied to the leads 9 to 13) are derived in dependence upon the modulation amplitudes of the signals appearing in the secondary windings 47 to 52 of the main and teaser transformers 42 and 43. The values of the most significant and the second most significant output signals supplied to the leads 13 and 12 are obtained by determining the signs of sin $(16\theta)$ and cos $(16\theta)$ rerespectively. These two operations are performed by a pair of identical amplitude-comparators 54 and 55 that are connected to the secondary windings 47 and 50 respectively. The secondary windings 47 and 50 have centre-taps 56 and 57 respectively to which alternating current from a potentiometer chain 58 is applied as a constant amplitude alternating current bias with respect to earth. The alternating current supply to the potentiometer chain 58 is obtained from the source 41.

The amplitude-comparator 54 has two signal input terminals 59 and 60, an output terminal 61, and an interrogating-pulse input terminal 62. (The terminals of the amplitude-comparator 55 that correspond to the terminals 59 to 62 are terminals 59' to 62' respectively.) The two signal input terminals 59 and 60 are connected to the two ends respectively of the winding 47, whereas the corresponding terminals 59' and 60' of the amplitude-comparator 55 are connected to the two ends respectively of the winding 50.

The input terminals 59 and 60 of the amplitude-comparator 54 are connected therein to the base electrodes of respective P-N-P junction transistors 63 and 64 that are both arranged in the common-emitter circuit configuration. The emitter-load of each transistor 63 and 64 comprises a shunt-connected resistor 65 and capacitor 66. The unidirectional signals that appear at the two emitter electrodes are applied to the base electrodes of two P-N-P junction transistors 67 and 68 respectively. The transistors 67 and 68 are interconnected as a long-tailed pair, so that current which in operation flows through a common emitter-resistor 69 of the long-tailed pair, flows through one or the other of the two transistors 67 and 68 in dependence upon which of the two unidirectional signals is the greater. Thus one or the other of the two transistors 67 and 68 conducts in dependence upon which of the signals applied to the terminals 59 and 60 has the greater amplitude.

The collector electrodes of the transistors 67 and 68 are connected to opposite ends of a primary winding 70 of a pulse transformer 71. A centre-tap 72 of the primary winding 70 is connected to the negative pole of a direct current supply source (not shown) for the transistors 67 and 68, so that collector current flows in one direction or the other through the winding 70 in dependence upon which of the transistors 67 and 68 is conductive.

The interrogating-pulse terminal 62 of the amplitude-comparator 54 is connected through a capacitor 73 and a resistor 74 to the junction of the emitter electrodes of the two transistors 67 and 68. A train of pulses is supplied via a lead 75 to the terminal 62 from a pulse source 76, and these pulses as applied to the emitter electrodes of the transistors 67 and 68 through the capacitor 73 and resistor 74, cause corresponding pulses of collector current to flow through the primary winding 70 of the pulse transformer 71. The sense of each consequent pulse induced in a secondary winding 77 of the pulse transformer 71 is dependent upon the direction of collector-current flow through the primary winding 70, and therefore, upon which of the two input signals to the terminals 59 and 60 has the greater amplitude. One end of the secondary winding 77 is connected to earth and the other end is connected to the output terminal 61.

Figure 4:
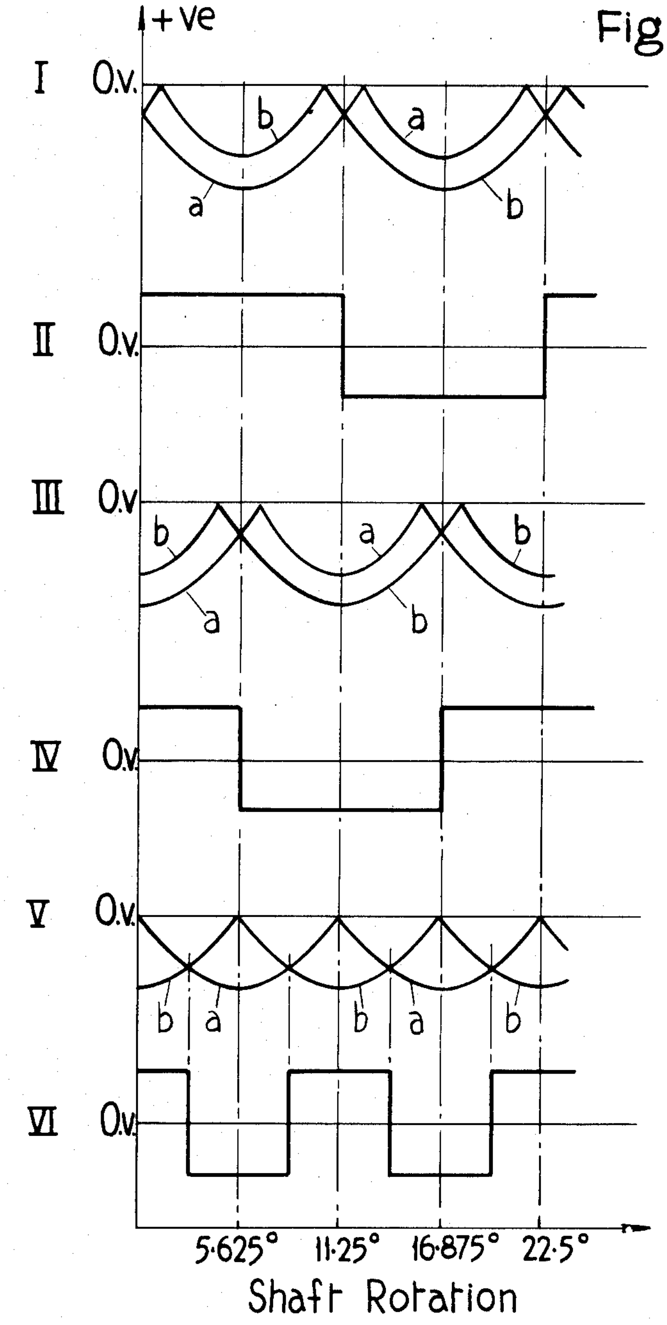
FIGURES 4 and 5 show waveforms of signals appearing in the circuit of FIGURE 3.

The train of pulses appearing at the output terminal 61 of the amplitude-comparator 54 constitutes the most significant of the five output signals of the fine position-encoding apparatus and is accordingly applied to the output lead 13. The amplitudes of the two input signals to the amplitude-comparator 54, wihch signals are derived from the secondary winding 47, are both dependent upon the value of sin $(16\theta)$. The application of the alternating current bias to the centre-tap 56 of the winding 47 results in one of the two input signals having a larger amplitude than the other throughout the first 11.25 degrees of each said section of 22.5 degrees of shaft rotation, and a smaller amplitude than the other throughout the second 11.25 degrees. The resulting signals applied to the base electrodes of the transistors 67 and 68 have waveforms represented by curves (*a*) and (*b*) respectively at (i) of FIGURE 4. As a result, the output pulses applied to the lead 13, as shown at (ii) of FIGURE 4, are positive-going for angular positions of the shaft 1 within the first 11.25 degrees of each said section, and negative-going for angular positions within the second 11.25 degrees. The value wihch is notionally ascribed to the pulses when positive-going is "0," and when negative-going is "1."

The amplitude-comparator 55 has exactly the same circuit and is operated in the same way as the amplitude-comparator 54. The train of pulses that appears at the output terminal 61' of the amplitude-comparator 55, in this case constitutes the second most significant of the five output signals of the fine position-encoding apparatus 3 and is accordingly applied to the output lead 12. The amplitudes of the two input signals to the amplitude-comparator 55, which signals appear at the two ends respectively, of the secondary winding 50 of the teaser transformer 43, are both dependent upon the value of cos ($16\theta$). The application of the alternating current reference signal to the centre-tap 57 of the winding 50 results in one of these two signals having a larger amplitude than the other throughout the first and last 5.625 degrees of each said section of 22.5 degrees of shaft rotation, and a smaller amplitude than the other throughout the central 11.25 degrees. The resulting signals applied to the base electrodes of the transistors in the amplitude-comparator 55 that correspond to the transistors 67 and 68, have waveforms represented by curves ($a$) and ($b$) respectively at (iii) of FIGURE 4. As a result, the output pulses applied to the lead 12, as shown at (iv) of FIGURE 4, are positive-going (and are then notionally ascribed the value "0") for angular positions of the shaft 1 within the first and last 5.625 degrees of each said section, but are negative-going (and are then notionally ascribed the value "1") for angular positions of the shaft 1 within the central 11.25 degrees of each said section.

The third most significant of the five output signals of the fine position-encoding apparatus 3 is derived by a comparison between the amplitude of the signal that appears in the amplitude-comparator 54 at the junction of the emitter electrodes of the transistors 67 and 68, and the corresponding signal in the amplitude-comparator 55. An amplitude-comparator 80 performs this function, the two signals being applied from terminals 78 and 78' of the amplitude-comparators 54 and 55 to input terminals 81 and 82 respectively of the amplitude-comparator 80.

The amplitude-comparator 80 includes two N-P-N junction transistors 83 and 84 that are interconnected as a long-tailed pair. The input terminals 81 and 82 are connected to the base electrodes of the transistors 83 and 84 respectively, so that current which in operation flows through a common emmitter-resistor 85 of the long-tailed pair, flows through one or the other of the transistors 83 and 84 in dependence upon which of the two input signals is the more negative with respect to earth. The collector electrodes of the transistors 83 and 84 are connected to opposite ends of a primary winding 86 of a pulse transformer 87. A centre-tap 88 of the primary winding 86 is connected to the positive pole of the direct current supply source (not shown) for the transistors 83 and 84, so that collector current flows in one direction or the other through the primary winding 86 in dependence upon which of the transistors 83 and 84 is conductive.

The train of pulses supplied by the source 76 is applied via the lead 75 to an interrogating-pulse input terminal 89 of the amplitude-comparator 80. Each such pulse is passed from the terminal 89 to the junction of the emitter electrodes of the transistors 83 and 84, and thereby, causes a corresponding pulse of collector current to flow through the primary winding 86. The sense of the consequent pulse which is induced in a secondary winding 90 of the pulse transformer 87 is dependent upon which of the two transistors 83 and 84 is conductive. One end of the secondary winding 90 is connected directly to earth and the other is connected to an output terminal 91.

The pulses appearing at the output terminal 91, which pulses are applied to the lead 11, are of one sense or the other in dependence upon which of the terminals 78 and 78' of the amplitude-comparators 54 and 55 is the more negative with respect to earth. The potential with respect to earth of the terminal 78 of the amplitude-comparator 54 varies as shown by curve ($a$) at (v) of FIGURE 4, through each section of 22.5 degrees of shaft rotation, the variation of the potential in each half of the section being comparable with the negative half-cycle of a sinusoidal wave. The potential with respect to earth of the terminal 78' of the amplitude-comparator 55, on the other hand, varies as represented by curve ($b$) at (v) of FIGURE 4, through each section of 22.5 degrees of shaft rotation. As a result, the output pulses applied to the lead 11, and as represented at (vi) of FIGURE 4, are positive-going (and are then notionally ascribed the value "0") for angular positions of the shaft 1 within the first and last 2.8125 degrees of each section of 22.5 degrees, and also within the central part of 5.625 degrees. On the other hand, the output pulses are negative-going (and are then notionally ascribed the value "1") for angular positions of the shaft 1 within the remaining two parts of 5.625 degrees.

The fourth most significant of the five output signals of the fine position-encoding apparatus is derived by comparing the amplitude of the signal at the junction of the emitter electrodes of the transistors 83 and 84 in the amplitude-comparator 80, with the amplitude of a further signal. The signal at the junction of the emitter electrode of the transistors 83 and 84 appears at a terminal 92 of the amplitude-comparator 80 and, as represented by curve ($a$) at (ii) of FIGURE 5, has an amplitude that becomes increasingly more negative through each of the first, third, fifth and seventh sections of 2.8125 degrees within each section of 22.5 degrees of shaft rotation and becomes increasingly less negative through each of the remaining sections of 2.8125 degrees. The said further signal is derived by an amplitude-comparator 94 from the signals that appear in the secondary windings 48, 49, 51 and 52 of the main and teaser transformers 42 and 43 respectively of the Scott-connected pair. Each of the windings 48, 49, 51 and 52 has $M/\sqrt{2}$ turns, where the total number of turns of each secondary winding 47 and 50 is 2M. The windings 48 and 51 are connected together in series in the same senses, whereas the windings 49 and 52 are connected together in series in opposite senses. The signal that appears across the series-connected windings 48 and 51, which signal is applied to an input terminal 95 of the amplitude-comparator 94, has an amplitude proportional to:

$$1/\sqrt{2}\sin(16\theta)+1/\sqrt{2}\cos(16\theta)$$

that is, to:

$$\sin(16\theta+\pi/4)$$

The signal that appears across the series-connected secondary windings 49 and 52, which signal is applied to an input terminal 96 of the amplitude-comparator 94, is proportional to:

$$1/\sqrt{2}\cos(16\theta)-1/\sqrt{2}\sin(16\theta)$$

that is, to:

$$\cos(16\theta+\pi/4)$$

The amplitude-comparator 94 is similar in basic design to the amplitude-comparator 54, comprising two common-emitter circuits and a long-tailed pair. The main difference resides in the circuit arrangement of the long-tailed pair which in this case includes two N-P-N junction transistors 97 and 98 (rather than P-N-P transistors). The collector electrodes of the transistors 97 and 98 are connected directly to the positive pole of the direct current supply source (not shown) for these transistors. Furthermore, the common emitter-load of the transistors 97 and 98 includes a pre-set potentiometer 99 by means of which a portion of the signal that appears at the junction of the two emitter electrodes is tapped-off and applied to an output terminal 100.

In the amplitude-comparator 94 one or the other of the two transistors 97 and 98 conducts in dependence upon which of the signals applied to the terminals 95 and 96 is of least ampitude. The signals applied to the base electrodes of the transistors 97 and 98 have waveforms represented by curves ($a$) and ($b$) respectively at (i) of FIGURE 5. The signal appearing at the output terminal 100 has an amplitude with respect to earth which, as represented by curve ($b$) at (ii) of FIGURE 5, becomes increasingly less negative through each of the first, third, fifth and seventh sections of 2.8125 degrees within any said section of 22.5 degrees of shaft rotation, and which becomes increasingly more negative through each of the other sections of 2.8125 degrees.

Figure 5:
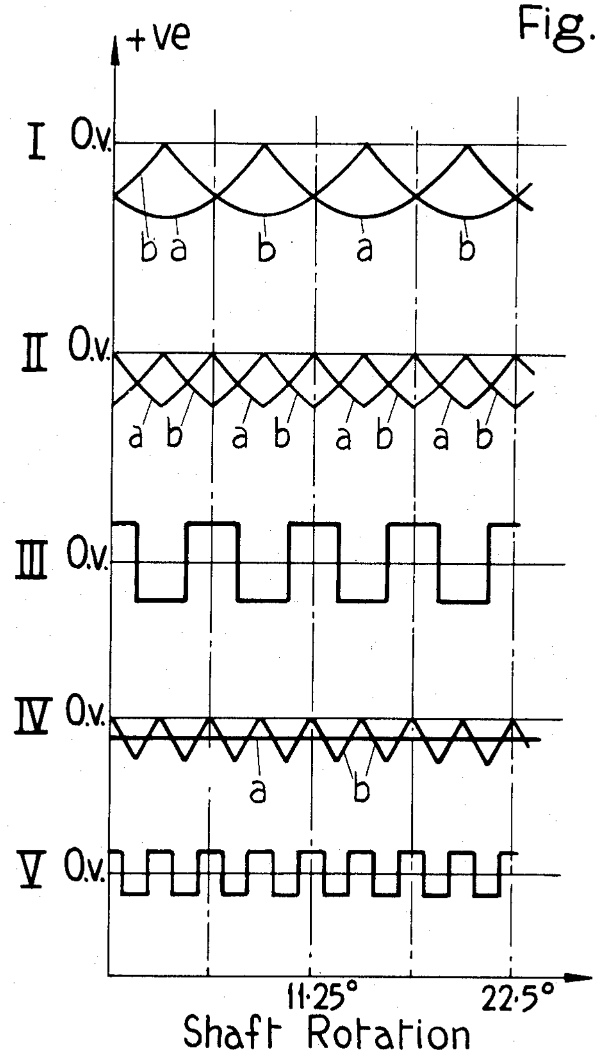
Figure 6:
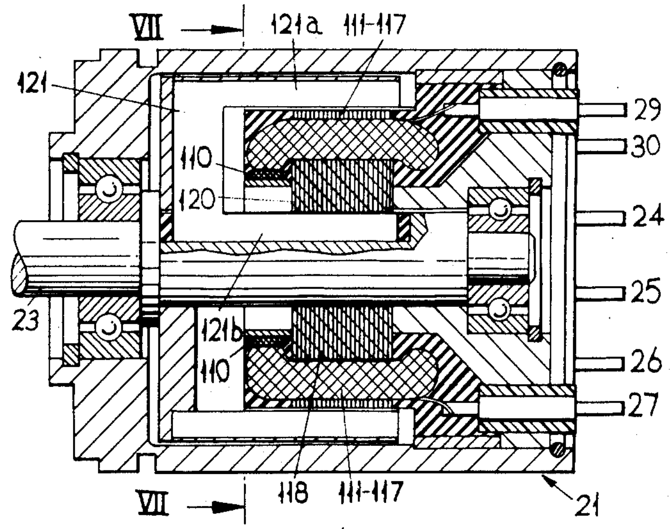
FIGURE 6 is a sectional elevation of a "coarse" position-encoder that forms part of the system of FIGURE 1.
Figure 7:
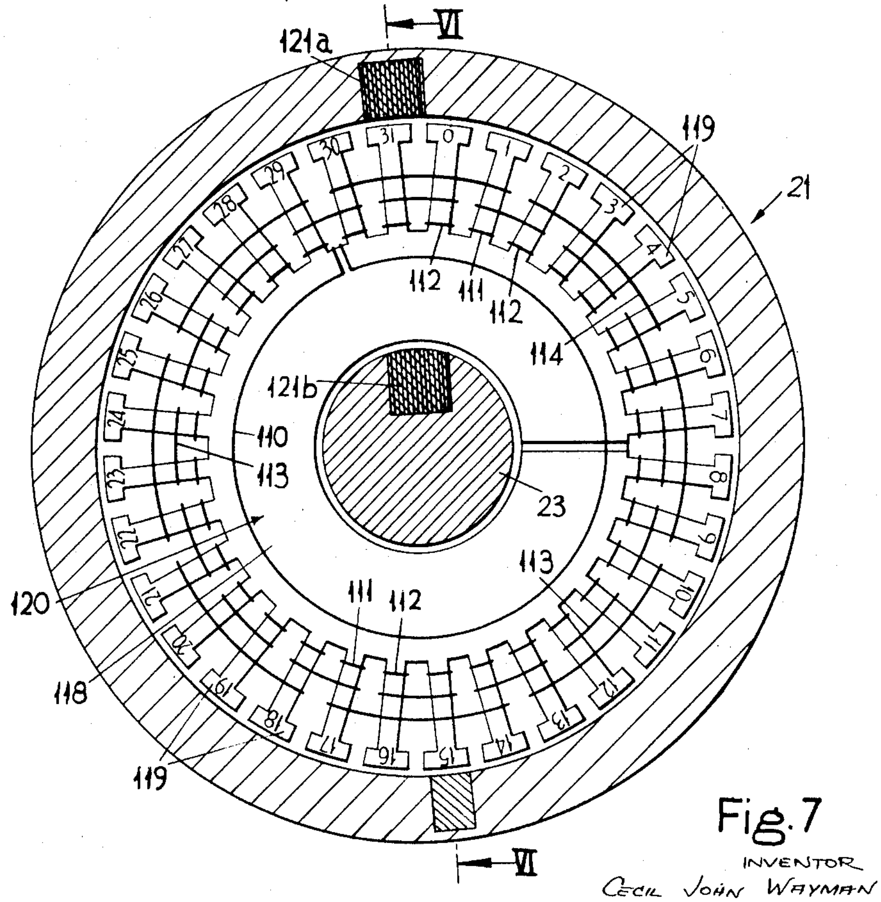
FIGURE 7 is an enlarged diagrammatic representation of a section taken on the line VII—VII of FIGURE 6 (the section of FIGURE 6 being taken on the line VI—VI of FIGURE 7)
Figure 8:
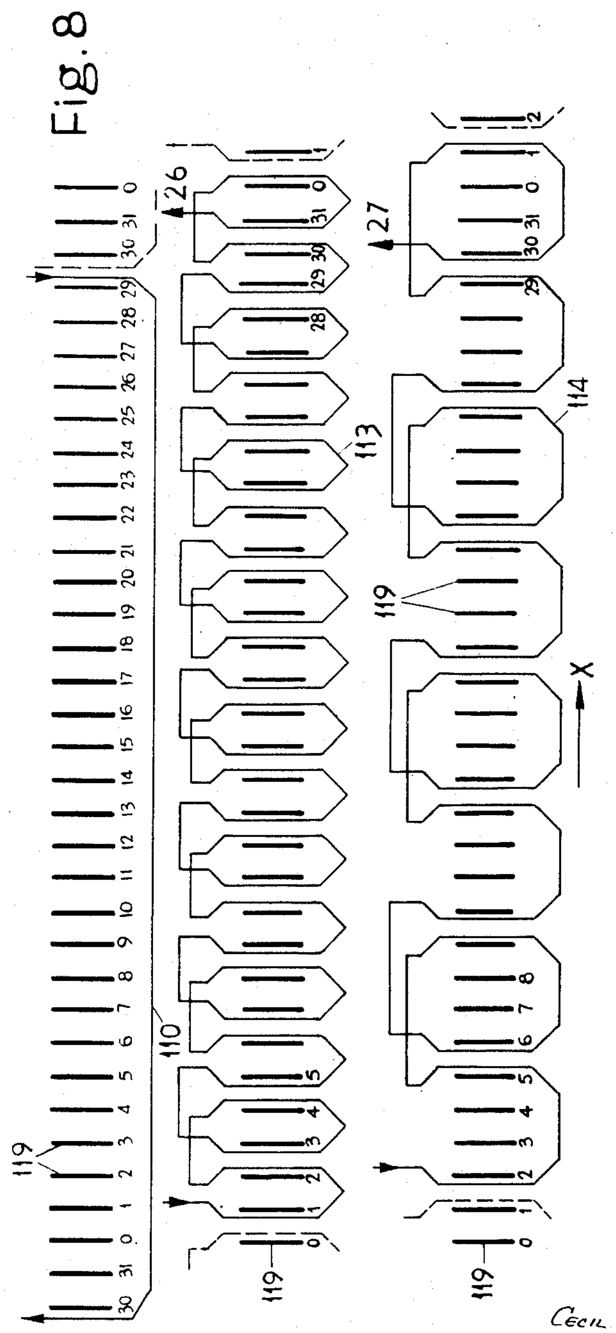
FIGURES 8 to 10 are diagrammatic representations of the arrangement of electrical windings in the position-encoder of FIGURES 6 and 7.
Figure 9:
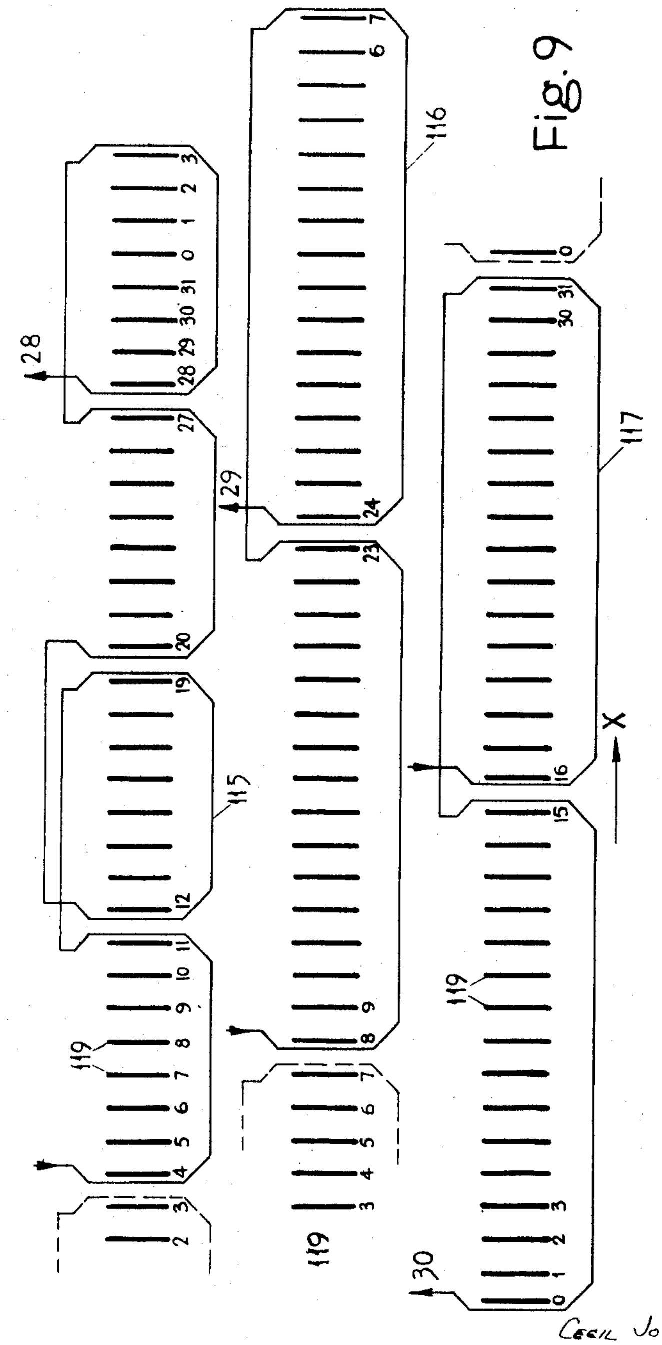
Figure 10:
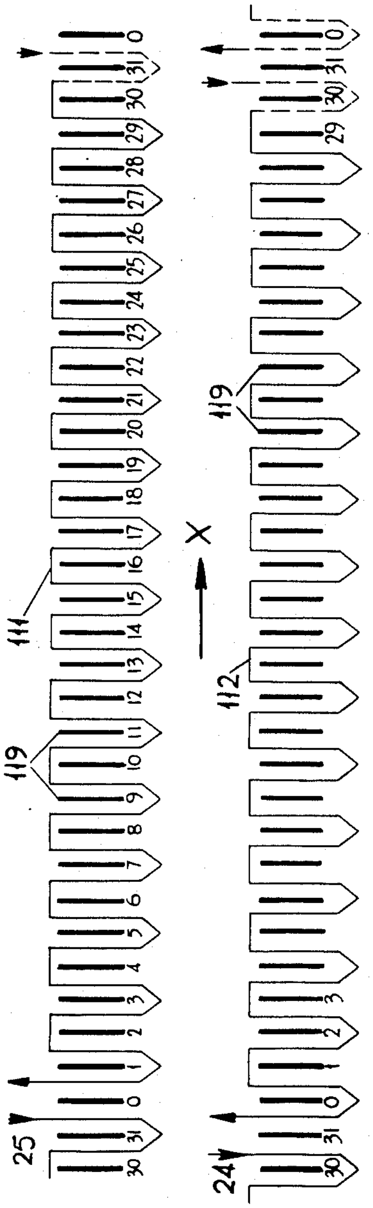

The signals that appear at the terminals 92 and 100 of the amplitude-comparators 80 and 94 respectively are compared in amplitude in an amplitude-comparator 101 which is identical in construction to the amplitude-comparator 80, and has terminals 81′, 82′, 89′, 91′ and 92′ corresponding to the terminals 81, 82, 89, 91 and 92 respectively of the amplitude-comparator 80. The signals appearing at the terminals 92 and 100 are applied to the input terminals 81′ and 82′ respectively of the amplitude-comparator 101. The resulting output pulses of the amplitude-comparator 101, which pulses appear at the terminal 91′ and are applied to the lead 10, are of one sense or the other in dependence upon which of the two input signals is the least negative with respect to earth. The output pulses, as represented at (iii) of FIGURE 5, are positive-going (and are then notionally ascribed the value "0") for angular positions of the shaft 1 within the first, fourth and fifth, eighth and ninth, twelfth and thirteenth, and sixteenth sections of 1.40625 degrees of said section of 22.5 degrees of shaft rotation. On the other hand, the output pulses are negative-going (and are then notionally ascribed the value "1") for angular positions of the shaft 1 within the remaining eight sections of 1.40625 degrees.

The least significant of the five output signals of the fine position-encoding apparatus 3 is derived by comparing the amplitude of the signal which appears at the terminal 92′ of the amplitude-comparator 101, with the amplitude of a direct current reference signal. This latter comparison is performed by an amplitude-comparator 102. The amplitude-comparator 102 in basic design is similar to the amplitude-comparator 80, the only material difference residing in the circuit arrangement of the long-tailed pair, which in this case includes two P-N-P junction transistors 103 and 104 (there are also of course consequent changes in polarity of the direct current supplies to the transistors).

The signal which appears at the terminal 92′ of the amplitude-comparator 101 is applied to an input terminal 105 of the amplitude-comparator 102. The direct current reference signal is applied to another input terminal 106 of the amplitude-comparator 102, this signal being derived by a rectifier unit 107 from the excitation signal supplied by the source 41. The amplitude of the direct-current reference signal, as represented by the line (*a*) at (iv) of FIGURE 5, is equal to the mean value about which the signal at the terminal 92′ varies as the shaft 1 is rotated through each said section of 22.5 degrees. The amplitude with respect to earth of this latter signal, as represented by the curve (*b*) at (iv) of FIGURE 5, becomes increasingly more negative through each of the first, third, fifth, seventh, ninth, eleventh, thirteenth, and fifteenth sections of 1.40625 degrees within any said section of 22.5 degrees, and increasingly less negative through each of the other eight sections of 1.40625 degrees. The variation in the amplitude through each of the sixteen sections of 1.40625 degrees is substantially linear.

Pulses from the source 76 are applied to an interrogating-pulse input terminal 108 of the amplitude-comparator 102, via the lead 75. The resulting output pulses appearing at an output terminal 109 of the amplitude-comparator 102, and accordingly applied to the lead 9, are, as represented at (v) of FIGURE 5, negative-going (and are then notionally ascribed the value "0") for angular positions of the shaft 1 within the first, fourth, and fifth, eighth and ninth, twelfth and thirteenth, sixteenth and seventeenth, twentieth and twenty-first, twenty-fourth and twenty-fifth, twenty-eighth and twenty-ninth, and the thirty-second sections of 0.703125 degree within each section of 22.5 degrees. The output pulses are positive-going (and are then notionally ascribed the value "1") for angular positions of the shaft 1 within the remaining sixteen sections (in eight pairs) of 0.703125 degree.

The values of the five output signals appearing on the leads 9 to 13 for angular positions of the shaft 1 within the thirty-two successive sections of 0.703125 degree in any one of the sixteen sections of 22.5 degrees of shaft rotation, are as set-out in the following table:

*Table I*

| Section | Values of Output Signals | Section | Values of Output Signals |
|---|---|---|---|
| 1st | 0 0 0 0 0 | 17th | 1 1 0 0 0 |
| 2nd | 0 0 0 0 1 | 18th | 1 1 0 0 1 |
| 3rd | 0 0 0 1 1 | 19th | 1 1 0 1 1 |
| 4th | 0 0 0 1 0 | 20th | 1 1 0 1 0 |
| 5th | 0 0 1 1 0 | 21st | 1 1 1 1 0 |
| 6th | 0 0 1 1 1 | 22nd | 1 1 1 1 1 |
| 7th | 0 0 1 0 1 | 23rd | 1 1 1 0 1 |
| 8th | 0 0 1 0 0 | 24th | 1 1 1 0 0 |
| 9th | 0 1 1 0 0 | 25th | 1 0 1 0 0 |
| 10th | 0 1 1 0 1 | 26th | 1 0 1 0 1 |
| 11th | 0 1 1 1 1 | 27th | 1 0 1 1 1 |
| 12th | 0 1 1 1 0 | 28th | 1 0 1 1 0 |
| 13th | 0 1 0 1 0 | 29th | 1 0 0 1 0 |
| 14th | 0 1 0 1 1 | 30th | 1 0 0 1 1 |
| 15th | 0 1 0 0 1 | 31st | 1 0 0 0 1 |
| 16th | 0 1 0 0 0 | 32nd | 1 0 0 0 0 |

In the above table the values of the respective output signals in each section of 0.703125 degree are set out in descending order of significance from left to right.

The construction of the coarse position-encoding apparatus 2 of FIGURE 1 will now be described with reference to FIGURES 6 to 11.

As stated above with reference to FIGURE 1, the coarse position-encoding apparatus includes a position-encoder 21 which in basic construction is the same as the position-encoder that is described with reference to FIGURES 1, 2 and 3 in British patent specification No. 863,027. The only material distinction between the present position-encoder and that described with reference to FIGURES 1, 2 and 3 in British patent specification No. 863,027, lies in the fact that there are three exciting windings rather than just one. One of the three exciting windings, which winding is referred to hereafter as the "common" exciting winding, corresponds exactly to the exciting winding (14) of the position-encoder which is described with reference to FIGURES 1, 2 and 3 in British patent specification No. 863,027. The other two exciting windings are referred to as the "even" and "odd" exciting windings respectively.

Referring to FIGURES 6 to 10, the common exciting winding 110 (FIGURE 8), the odd exciting winding 111 (FIGURE 10), and the even exciting winding 112 (FIGURE 10), together with five secondary windings 113 to 117 (FIGURES 8 and 9), are wound upon a toothed ferromagnetic stator 118. (In FIGURE 6 the windings 111 to 117 have the general reference 111–117, whereas in FIGURE 7, the windings 110 to 114 only, are shown.) The stator 118 has the general form of a hollow cylinder with thirty-two teeth 119 projecting radially outwards from its outer circumference. The teeth 119 on the stator 118 have a pitch which is twice their width and they are symmetrically disposed round the stator 118, so that their angular pitch is 11.25 degrees.

The common exciting winding 110 is wound to lie round all the thirty-two teeth 119, Nos. 0 to 31, at one end 120 of the stator 118. The odd and even exciting windings 111 and 112 on the other hand are wound respectively to lie round the odd numbered teeth 119, Nos. 1, 3, 5, . . . , 29 and 31, and the even numbered teeth 119, Nos. 0, 2, 4 . . . 28, and 30, at the end 120 of the stator 118. The three exciting windings 110 to 112 are wound in the same sense, the common exciting winding 110 comprising fifty turns and the odd and even windings 111 and 112 comprising twenty turns each.

The five secondary windings 113 to 117, each of which comprises fifteen turns, are also wound to lie round the teeth 119 at said one end 120 of the stator 118. The secondary winding 113 is wound to lie round pairs of the teeth 119, the winding 114 is wound to lie round groups of four, the winding 115 is wound to lie round groups of eight, and the windings 116 and 117 are wound to lie round different groups of sixteen of the teeth 119. The senses of the individual windings 113 to 117 where they are wound at said one end 120, alternates round the stator 118. The two senses in which each winding 110 to 117 is wound are referred to as "positive" and "negative," any winding being wound in the positive sense where its direction (as indicated by arrows at its ends) is as indicated by the arrows X (FIGURES 8 to 10), and in the negative sense where in the opposite direction.

Since the sense of each of the secondary windings 113 to 117 is alternated round the stator 118, and there are the same number of portions of the winding in one sense as in the other, the resulting normal inductive coupling between any one of the three exciting windings 110 to 112 and any one of the five secondary windings 113 to 117 is substantially zero.

The shaft 23 of the position-encoder 21 is mounted to lie generally within, and coaxial with, the stator 118, and carries a U-shaped ferromagnetic yoke 121 which is arranged to complete a magnetic circuit that extends through one tooth 119 of the stator 118 for any angular position of the shaft 23. The particular one of the thirty-two teeth 119 through which the magnetic circuit extends, is dependent upon the actual angular position of the shaft 23 and therefore upon the angular position of the shaft 1. The magnetic circuit extends radially through the stator 118 (the two arms 121*a* and 121*b* of the U-shaped yoke 121 lying parallel to the common longitudinal axis of the shaft 23 and stator 118) and embraces those of the winding 110 to 117 that lie on the relevant tooth 119 at the end 120 of the stator 118.

The magnetic circuit links the common exciting winding 110 and one or the other of the odd and even exciting windings 111 and 112 directly to each of the five secondary windings 113 to 117 at the end 120 of the stator 118. The sense of the resulting additional inductive couplings between the relevant ones of the exciting windings 110 to 112 and the respective secondary windings 113 to 117 is dependent upon the senses with which the secondary windings 113 to 117 are wound at the end 120. The particular one of the odd and even exciting windings 111 and 112 which is linked to the secondary windings 113 to 117 by the magnetic circuit of course depends upon whether the particular tooth 19 through which the magnetic circuit extends is an even or odd numbered tooth—if it is an odd numbered tooth it is the odd winding 111, and if it is an even numbered tooth it is the even exciting winding 112.

Figure 11:
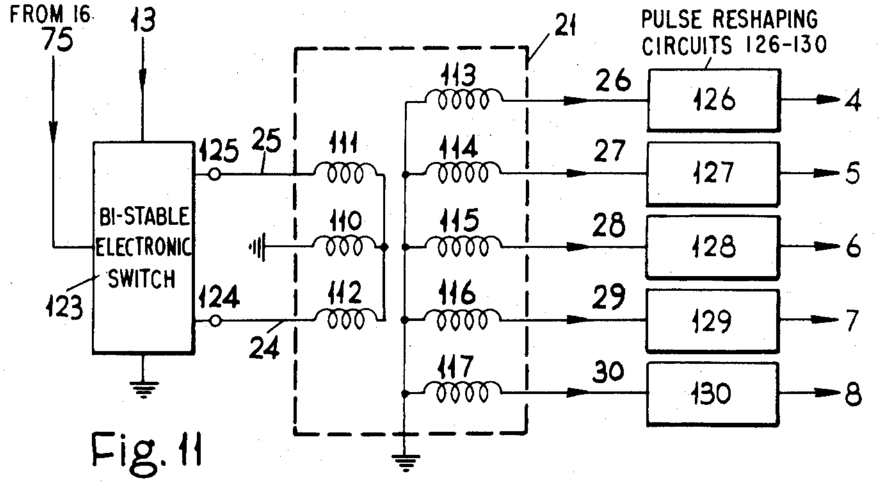
FIGURE 11 is a circuit diagram of "coarse" position-encoding apparatus including the position-encoder of FIGURES 6 and 7.

Referring now to FIGURE 11, the three exciting windings 110 to 112 are connected via leads 24 and 25 to receive a train of exciting pulses from a bistable electronic switch 123 in the unit 22. The bistable switch 123 is controlled by the most significant of the output signals from the fine position-encoding apparatus 3, that is to say, by the signal appearing on lead 13. The switch 123 adopts one of its two stable states, the state "0," when the value of the controlling signal on the lead 13 is "0," and adopts the other stable state, the state "1," when the value of the controlling signal is "1." The train of exciting pulses is applied to the switch 123 via the lead 75 from the source 76 of the fine position-encoding apparatus 3, and appears at one or the other of output terminals 124 and 125 of the switch 123 in dependence upon the state "0" or "1" of the switch 123. While the train of exciting pulses appears at either one of the two output terminals 124 and 125, the other output terminal 124 or 125 is maintained at earth potential.

The odd and even exciting windings 111 and 112 are connected in series between the two output terminals 124 and 125 of the bistable switch 123, and the common exciting winding 110 is connected between the junction of the odd and even windings 111 and 112, and earth. Thus the exciting pulses excite one or the other of the odd and even exciting windings 111 and 112 in series with, and the other in parallel with, the common exciting winding 110, in dependence upon the state "0" or "1" of the bistable switch 123. When the switch 123 is in the state "0" the even exciting winding 112 is excited in series with the windings 110 and 111, whereas when the switch 123 is in the state "1" the odd exciting winding 111 is excited in series with the exciting windings 110 and 112.

The odd and even windings 111 and 112 are connected together between the two output terminals 124 and 125 in opposite senses, so that when the bistable switch 123 is in the state "0," the magnetic flux in the stator 118 (FIGURES 6 and 7) which is due to the common exciting winding 110 is augmented in the even numbered teeth 119 by the flux which is due to the even exciting winding 112, but is reduced in the odd numbered teeth 119 by the flux which is due to the odd exciting winding 111. On the other hand, when the bistable switch 123 is in the state "1" the magnetic flux which is due to the common exciting winding 110 (which flux is of the same sense as before) is augmented in the odd numbered teeth 119 by the flux which is due to the odd exciting winding 111, but is reduced in the even numbered teeth 119 by the flux which is due to the even exciting winding 12. The resultant effect therefore is that the even numbered teeth 119 are magnetically excited to a larger extent than the odd numbered teeth 119 when the value of the signal on the lead 13 is "0," and vice versa when the value is "1."

Each exciting pulse causes a pulse to be induced in each of the five secondary windings 113 to 17. The sense of each induced pulse with respect to the exciting pulse is dependent upon the sense, positive or negative, of the relevant secondary winding 113 to 117 where it is linked by the yoke 121 (FIGURES 6 and 7) to the exciting windings 110 to 112. If a secondary winding 113 to 117 is wound in the positive sense where it is linked, then the sense of the pulse induced in that secondary winding is the same as that of the exciting pulse. On the other hand, if the winding is in the negative sense where it is linked, the sense of the induced pulse is opposite to that of the exciting pulse. The combination of those of the secondary windings 113 to 117 within which the induced pulses are of the same sense as the exciting pulse (and consequently, also, the complementary combination of secondary windings within which the induced pulses are of the opposite sense) is characteristic of the angular position of the yoke 121 with respect to the stator 118, and therefore, of the angular position of the shaft 1. The induced pulses which are of the same sense as the exciting pulse are notionally ascribed the value "1" and those which are of the opposite sense are notionally ascribed the value "0."

If the common exciting winding 110 alone was excited there would be no change in the combination of secondary windings 113 to 117 which supply pulses of value "1," throughout angular displacement of the yoke 121 relative to the stator 118 within an angular range of 11.25 degrees centred upon any tooth 119. As a result the output signals from the secondary windings 113 to 117 would be characteristic of within which of thirty-two angular sections (which are of 11.25 degrees each) the shaft 15 lies.

In the present case, as described above, the exciting pulses are applied to the odd and even exciting windings 111 and 112 as well as to the common exciting winding 110. The effect of the resulting unequal magnetic excitation of alternate teeth 119 is to increase and decrease alternate sections of shaft rotation over which there is no change in the combination of secondary windings 113 to 117 that supply pulses of value "1." When the even numbered teeth 119 are magnetically excited to a larger extent than the odd numbered teeth 119 (that is, when the value of the most significant output signal of the fine position-encoding apparatus 3 is "0") the first, third, fifth, . . . twenty-ninth, and thirty-first 11.25 degree sections of shaft rotation are each enlarged (only as far as the coarse position-encoder 2 is concerned). Each such section is enlarged by some three degrees on both sides of its respective even numbered tooth 119. The other sections are correspondingly reduced. When, on the other hand, the odd numbered teeth 119 are magnetically excited to a larger extent than the even numbered teeth 119 (that is, when the value of the most significant output signal of the fine position-encoding apparatus 3 is "1") the second, fourth, sixth, . . . thirtieth, and thirty-second sections of shaft rotation are each enlarged, the other sections being correspondingly reduced.

While the shaft is within any one of the first, third, . . . , and thirty-first sections of 11.25 degrees the value of the most significant of the output signals from the fine position-encoding apparatus 3 is "0." The combination of secondary windings 113 to 117 which supply pulses of value "1," does not change throughout this section. In fact, due to the enlargement of the first, third, . . . , and thirty-first sections within the position-encoder 21 at this time, there is no change even if there is a small displacement of the shaft 1 out of the section. However when the shaft 1 does rotate out of this section of 11.25 degrees there is a change from "0" to "1" in the value of the most significant of the output signals from the fine position-encoding apparatus 3. This change in value results in a change in the prevailing system of sections of shaft rotation within the position-encoder 21. The second, fourth, . . . , and thirty-second sections are now enlarged and the first, third, . . . and thirty-first sections are reduced in extent. It is this change in extent of the thirty-two sections within the position-encoder 25 that effects a change in the combination of secondary windings 113 to 117 that supply pulses of value "1." This ensures that the representation provided by the position-encoder 21 is accurately coordinated to the sections of shaft rotation which are defined by the fine position-encoding apparatus 3. For example, if the shaft 1 is initially within the first section of 11.25 degrees the values of the output signals from the respective five secondary windings 113 to 117 are:

0 0 0 0 0

The range of shaft rotation over which these values remain unchanged is greater than 11.25 degrees since the first section of shaft rotation within the position-encoder 21 is at this time enlarged. If the shaft 1 is now rotated out of the first section of 11.25 degrees into the second section of 11.25 degrees, the resulting change in value of the signal on the lead 13 causes the first section within the position-encoder 21 to be reduced in extent and the second section enlarged. As a consequence of the reduction and enlargement in extent of the first and second sections respectively, the shaft 1 now lies within the second section according to the newly prevailing system of sections within the position-encoder 21. The values of the output signals from the respective secondary windings 113 to 117 are now therefore:

0 0 0 0 1

(The digits being set out in descending order of significance from left to right.) The change in value of the pulses supplied by the secondary winding 113 in this manner accompanies the change in the value of the most significant output signals from the fine position-encoding apparatus 3.

The signals which are supplied by the secondary windings 113 to 117 are applied via the leads 26 to 30 to five pulse-reshaping circuits 126 to 130 respectively of the unit 22. The resulting trains of output pulses from the reshaping circuits 126 to 130 are applied to the leads 4 to 8 respectively. The values of the output signals on the output leads 4 to 8 for angular positions of the shaft 1 within the thirty-two successive sections of 11.25 degrees in any complete revolution of the shaft 1 are the same as set-out in Table I.

The five output signals from the coarse position-encoding apparatus 2 (appearing on the leads 4 to 8) taken with the four lesser significant output signals from the fine position-encoding apparatus 3 (appearing on the leads 9 to 12), are characteristic of the angular position of the shaft 1 within any one of the five-hundred-and-twelve sections of 0.703125 degree of each revolution of the shaft 1. This high resolution is obtained without the necessity of step-up gearing and the attendant disadvantages. Furthermore, although separate coarse and fine position-encoding apparatuses 2 and 3 are used, changes in the output signals from the coarse position-encoding apparatus 2 are coordinated to the transitions between the sections of 11.25 degrees of shaft rotation that are defined within the fine position-encoding apparatus 3. As a result of this coordination there is no possibility of inconsistency between the representations provided by the coarse and fine position-encoding apparatuses 2 and 3. Such inconsistency might otherwise result from small constructional and operational errors in the two position-encoding apparatuses 2 and 3.

In its broad aspect the coordination of output representations of two coding means such as the fine and coarse position-encoding apparatuses 2 and 3 of the present system, is the subject of the co-pending cognate British patent application Nos. 1051/59 and 1052/59.

Although in the system described above the output signals from the coarse and fine position-encoding apparatuses 2 and 3 are trains of pulses, these output signals may instead be alternating currents. In this case alternating current is applied as the interrogating signal to each of the amplitude-comparators 54, 55, 80, 101 and 102 in the fine position-encoding apparatus 3. The resulting output signal from each of the amplitude-comparators 54, 55, 80, 101 and 102 in these circumstances is either in-phase or in anti-phase with the applied interrogating signal in dependence upon the value, "0" or "1," which is then appropriate to the position of the shaft 1. The same alternating current signal is also applied to excite the position-encoder 21 instead of, but in a similar manner to, the train of exciting pulses. The signals which in these circumstances are induced in the five secondary windings 113 to 117 are either in-phase or in anti-phase with the exciting signal in dependence upon the value "0" or "1" which is appropriate to the position of the shaft 1. The pulse-reshaping circuits 126 to 130 of the coarse position-encoding apparatus 2 are dispensed with in this case.

In the system described above, the position of the shaft 1 is represented according to a nine digit binary code, however the system may be modified so that the position of the shaft 1 is represented according to some other code. For example the system may be modified so that the shaft position is represented according to a nine digit cyclic binary-coded decimal code. With this latter nine digit code the position of the shaft 1 is represented to within $1/200$ part of a revolution, that is, to within 1.8 degrees. A representation of the position of the shaft 1 to within $1/1000$ part of a revolution can be obtained using a twelve digit binary-coded decimal code.

A system which is arranged to provide a representation of the position of a shaft according to a nine digit cyclic binary-coded decimal code will now be described with reference to FIGURES 12 and 13. In this system the fine and coarse position encoding apparatuses provide the same number of output signals as in the system described above with reference to FIGURES 1 to 11. The coarse position-encoding apparatus provides five output signals that are respectively representative of the values of the five more significant digits and the fine position-encoding apparatus provides four output signals that are respectively representative of the values of the four lesser significant digits. The five output signals from the coarse position-encoding apparatus represent the shaft position as lying within one of twenty sections of eighteen degrees each, whereas the four output signals from the fine position-encoding apparatus represent the shaft rotation to within 1.8 degrees within this section of eighteen degrees. The fine position-encoding apparatus also provides a fifth output signal (coressponding to the signal on the lead 13 of FIGURE 1) which is used to coordinate the representations provided by the two encoding apparatuses.

Figure 12:
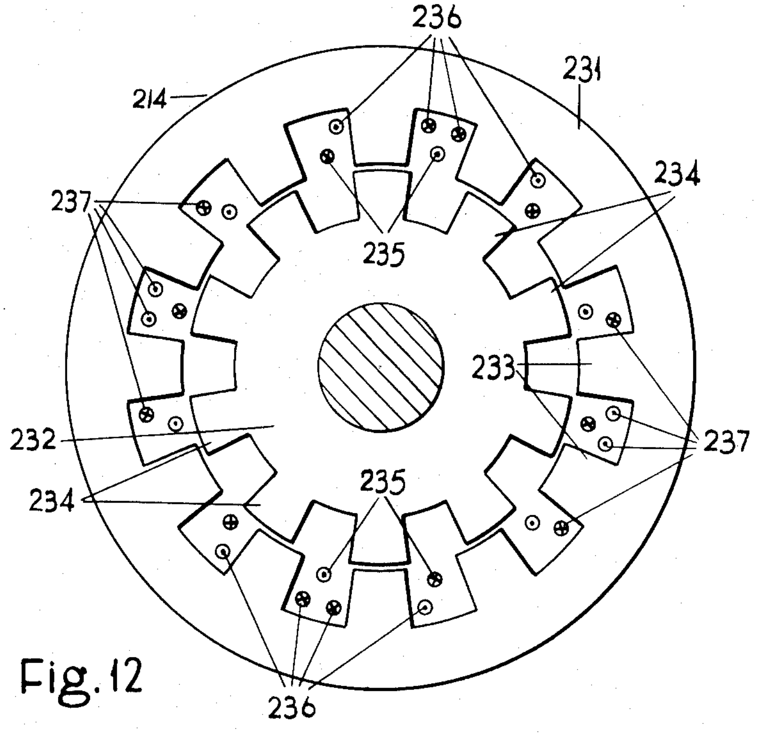
FIGURE 12 is an end elevation of a variable-reluctance transformer that forms part of the second system to be described.
Figure 13:
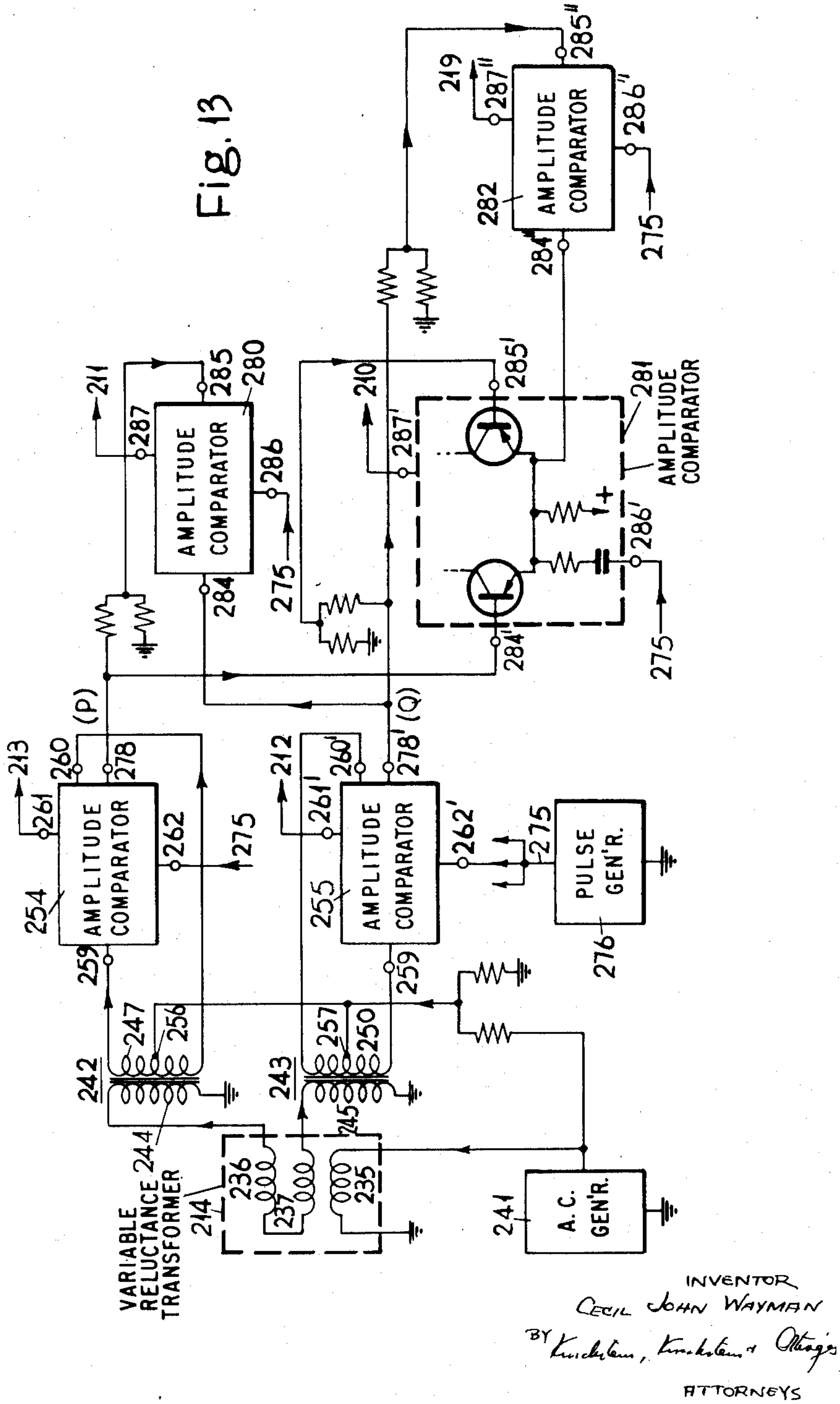
FIGURE 13 is a circuit diagram of "fine" position-encoding apparatus including the variable-reluctance transformer of FIGURE 12.

Referring to FIGURES 12 and 13, the variable-reluctance transformer 214 of the fine position-encoding apparatus in this case, has twelve teeth 233 on its stator 231 and ten teeth 234 on its rotor 232. A primary winding 235, and two secondary windings 236 and 237 (instead of three), are wound on the stator 231, each secondary winding 236 and 237 being wound round two diammetrically opposite pairs of teeth 234. The two secondary windings 236 and 237 are displaced from one another by ninety degrees round the stator 231. The signals which are induced in the two windings 236 and 237 as a result of excitation of the primary winding 235 from an alternating current source 241, are dependent in amplitude upon sin $(10\theta)$ and cos $(10\theta)$ respectively.

The signals induced in the windings 236 and 237 are applied to primary windings 244 and 245 of two similar, but separate, transformers 242 and 243 respectively.

Since the output signals from the variable-reluctance transformer 214 are already dependent respectively upon sine and cosine functions of $\theta$, the Scott-connected pair of transformers 32 and 43 used in the arrangement of FIGURE 3 is not in this case required. The alternating current signal supplied to the source 241 is applied to centre-taps 256 and 257 of two secondary windings 247 and 250 of the two transformers 242 and 243.

The values of the most and second most significant of the output signals of the fine position-encoding apparatus are derived from the signals that appear at the opposite ends of the two secondary windings 247 and 250 by amplitude-comparators 254 and 255 respectively. The amplitude-comparators 254 and 255 are exactly the same, and perform the same functions, as the amplitude-comparators 54 and 55 described above with refernece to FIGURE 3, terminals 259 to 262 and 278, and 259′ to 262′ and 278′ of the amplitude-comparators 254 and 255 corresponding to the terminals 59 to 62 and 78 respectively of the amplitude-comparator 54. As a result the values of the most significant and second most significant output signals appearing on leads 213 and 212 are dependent upon the signs of sin $(10\theta)$ and cos $(10\theta)$ respectively.

The values of the third and fourth most significant and the least significant of the output signals, are derived by amplitude-comparators 280 to 282 respectively. The amplitude-comparators 280 to 282 are each exactly the same as the amplitude-comparator 102 described above with reference to FIGURE 3, terminals 284 to 287, 284′ to 287′ and 284″ to 287″ of the respective amplitude-comparators 280 to 282 corresponding to the terminals 105, 106, 108 and 109 respectively of the amplitude-comparator 102. Output pulses appearing at the output terminals 287, 287′ and 287″ of the amplitude-comparators 280 to 282 are applied to output leads 211, 210, and 209 respectively, of the apparatus.

The amplitude-comparators 280 and 281 are connected to receive input signals which are derived from the two auxiliary signals, P and Q say, that appear at the terminals 278 and 278′ respectively of the amplitude-comparators 254 and 255. The connections are such that the amplitude-comparator 280 performs a comparison between the amplitude of the signal P when reduced by a factor $a$ (that is, $P/a$), and the amplitude of the signal Q. The amplitude comparator 281 on the other hand performs a comparison between the signal P, and the amplitude of the signal Q when reduced by a factor $b$ (that is, $Q/b$).

The amplitude-comparator 282 is connected to perform a comparison between the amplitude of the signal Q when reduced by a factor $c$ (that is, $Q/c$), and the amplitude of the signal which appears at the common-emitter junction of the long-tailed pair 288 in the amplitude-comparator 281.

The values of the factors $a$, $b$ and $c$ are chosen to obtain the desired changes in values of the third and fourth most significant and the least significant of the five output signals.

Interrogating pulses are applied to each of the amplitude-comparators 254, 255, 280, 281 and 282 via a lead 275 from a source 276. The values of the resultant signals that appear on the leads 209 to 215 in each of twenty consecutive sections of 1.8 degrees are as set out in the following table:

*Table II*

| Section | Values of Output Signals | Section | Values of Output Signals |
|---|---|---|---|
| 1st | 0 0 0 0 0 | 11th | 1 1 0 0 0 |
| 2nd | 0 0 0 0 1 | 12th | 1 1 0 0 1 |
| 3rd | 0 0 0 1 1 | 13th | 1 1 0 1 1 |
| 4th | 0 0 0 1 0 | 14th | 1 1 0 1 0 |
| 5th | 0 0 1 1 0 | 15th | 1 1 1 1 0 |
| 6th | 0 1 1 1 0 | 16th | 1 0 1 1 0 |
| 7th | 0 1 0 1 0 | 17th | 1 0 0 1 0 |
| 8th | 0 1 0 1 1 | 18th | 1 0 0 1 1 |
| 9th | 0 1 0 0 1 | 19th | 1 0 0 0 1 |
| 10th | 0 1 0 0 0 | 20th | 1 0 0 0 0 |

In the above table the values of the respective output signals in each section of 1.8 degrees are set out in descending order of significance from left to right.

The five output signals from the coarse position-enconding apparatus within twenty sections of eighteen degrees are also as set out in Table II. The only difference between the coarse position-encoding apparatus of the present apparatus and that in the system which is described above with reference to FIGURES 1 to 11, lies in the position-encoder. The position-encoder in the present case has a stator with twenty teeth rather than thirty-two, and the winding arrangement of the five secondary windings in this encoder is different. The five secondary windings are wound round the twenty teeth of the stator so that they give the desired coding as set out in Table II, the winding arrangement to give this coding being the same as described in British patent specification No. 863,027 with reference to FIGURE 6.

If it is desired to provide a representation of the position of a shaft to within $1/1000$ part of a revolution using a twelve digit binary-coded decimal code, then the position of the shaft may be represented as lying within one of one hundred sections of 3.6 degrees by eight output signals from a coarse position-encoding apparatus, and to within 0.072 degree by four outupt signals from a fine position-encoding apparatus. The position-encoder of the coarse position-encoding apparatus in these circumstances is substantially the same as that described in British patent specification No. 863,027 with reference to FIGURES 7 and 8, except that there are in this case one hundred teeth (formed by respective pairs of ferromagnetic laminations) rather than one hundred-and-twenty-eight. Furthermore, the stator and rotor of the variable-reluctance transformer of the fine position-encoding apparatus have forty-eight and fifty teeth respectively.

I claim:

1. Electrical position encoding apparatus comprising a variable reluctance transformer that comprises a primary winding, a plurality of secondary windings, a pair of ferromagnetic cores, a series of ferromagnetic teeth on each said core, the two series being mutually opposed and of different tooth-pitch thus giving a cyclic relationship between opposing teeth there being at least one cycle in each said series, one said core being movable relative to the other to vary inductive coupling between the primary and each secondary winding, cyclic variation of said inductive coupling being produced by continuous movement of the teeth of said one core past each of the teeth of the other core, and said secondary windings being positioned with respect to each other so that, owing to the different tooth-pitches of the cores and the consequent cyclic tooth relaionship, said cyclic variation of inductive coupling is of different phase for each secondary winding; and circuit means including means for deriving from signals induced in the secondary windings when the primary winding is excited with alternating current at least one pair of signals which have amplitudes that vary cyclically in accordance with the cyclic variations of said inductive couplings, and at least a corresponding number of amplitude-comparators, each said pair of signals being applied to a respective amplitude-comparator and each amplitude-comparator supplying an output signal that has one of two digital values in dependence upon which of the pair of signals applied to the respective amplitude-comparator is of greater amplitude, the output signals being in combination characteristic of the relative position of said cores.

2. Electrical position-encoding appaartus according to claim 1 and including a first and a second of said amplitude comparators, an output terminal of said first amplitude comparator from which one said digital output signal is supplied, two input terminals for each comparator, a point in said first amplitude comparator circuit at which a signal constituting a combination of the pair of signals applied to said input terminals is obtained, and a connection between said point and one said input terminal of said second amplitude comparator to provide one signal of the pair of signals applied to said second amplitude comparator.

3. Electrical position-encoding apparatus according to claim 2 and including a third amplitude comparator, two input terminals of said third amplitude comparator to which, respectively, the signals of one said pair of signals are applied, an output terminal of said third amplitude comparator from which one said digital output signal is supplied, a point in said third amplitude comparator circuit at which a signal constituting a combination of the pair of signals applied to said input terminals of the third amplitude comparator is obtained, and a connection between said point of the third amplitude comparator and the other said input terminal of said second amplitude comparator to provide the other signal of said pair of signals applied to said second amplitude comparator.

4. Electrical position-encoding apparatus according to claim 1 and including means to provide a signal of substantially constant magnitude, this signal constituting one signal of the pair of signals applied to one amplitude comparator.

5. Electrical position-encoding apparatus according to claim 1 wherein the variable reluctance transformer comprises a ferromagnetic stator, a ferromagnetic rotor, a series of ferromagnetic teeth on each of the stator and rotor, a primary winding on said stator, a plurality of secondary windings that embrace different groups of teeth of the stator, said rotor being mounted for rotation relative to said stator to vary inductive coupling between the primary winding and each secondary winding, said secondary windings being positioned with respect to each other so that, owing to the different tooth-pitches of said cores, the secondary windings have different inductive couplings with the primary winding, there being a multiplicity of cycles, corresponding to the number of teeth on the rotor, of variation of said inductive coupling when the rotor is rotated through one revolution relative to the stator.

6. Electrical position-encoding apparatus according to claim 5 wherein the stator and rotor have different numbers of teeth in which numbers the factor two is the only common factor, the primary winding is wound on the stator teeth so that its sense alternates from one stator tooth to the next, and each secondary winding embraces diametrically opposite stator teeth in opposite sense.

7. Electrical position-encoding apparatus according to claim 6 wherein the variable-reluctance transformer has three secondary windings that are displaced with respect to the stator by 120 degrees from one another around the stator.

8. Electrical position-encoding apparatus according to claim 7 wherein said circuit means include a Scott-connected pair of transformers to which the three secondary windings are connected, said transformers providing, in operation, signals having amplitudes that are dependent upon sin $(n\theta)$ and cos $(n\theta)$ respectively, where $n$ is the number of teeth on the rotor and $\theta$ is the angular displacement of the rotor from a datum position relative to the stator.

9. Electrical position-encoding apparatus according to claim 8 including means to modify said signals having amplitudes dependent upon sin $(n\theta)$ and cos $(n\theta)$ respectively so that the amplitudes are dependent upon the signs of sin $(n\theta)$ and cos $(n\theta)$ respectively, one amplitude compartor to which a pair of the modified signals dependent upon the sign of sin $(n\theta)$ is applied for comparison of amplitude, the dependence of amplitude upon the sign of sin $(n\theta)$ being such that the predominance in amplitude of one signal of the pair over the other is inverted with change of sign of sin $(n\theta)$ the digital value of the output signal from said one amplitude comparator being dependent upon the sign of sin $(n\theta)$, and a further amplitude comparator to which a pair of the modified signals dependent upon the sign of cos $(n\theta)$ is applied for comparison of amplitude, the dependence of amplitude upon the sign of cos $(n\theta)$ being such that the predominance of one signal amplitude of the pair over the other is inverted with change of sign of cos $(n\theta)$, the digital value of the output signal from said further amplitude comparator being dependent upon the sign of cos $(n\theta)$.

10. Electrical position-encoding apparatus according to claim 5 wherein the variable-reluctance transformer has two secondary windings that are displaced by 90 degrees from one another around the stator, the signals induced in these two secondary windings having amplitudes that are dependent upon sin $(n\theta)$ and cos $(n\theta)$ respectively, where $n$ is the number of teeth on the rotor and $\theta$ is the angular displacement of the rotor from a datum position relative to the stator.

11. Electrical position-encoding apparatus according to claim 10 including, means to modify said signals having amplitudes dependent upon sin $(n\theta)$ and cos $(n\theta)$ respectively so that the amplitudes are dependent upon the signs of sin $(n\theta)$ and cos $(n\theta)$ respectively, one amplitude comparator to which a pair of the modified signals dependent upon the sign of sin $(n\theta)$ is applied for comparison of amplitude, the dependence of amplitude upon the sign of sin $(n\theta)$ being such that the predominance in amplitude of one signal of the pair over the other is inverted with change of sign of sin $(n\theta)$ the digital value of the output signal from said one amplitude comparator being dependent upon the sign of sin $(n\theta)$, and a further amplitude comparator to which a pair of the modified signals dependent upon the sign of cos $(n\theta)$ is applied for comparison of amplitude, the dependence of amplitude upon the sign of cos $(n\theta)$ being such that the predominance of one signal amplitude of the pair over the other is inverted with change of sign of cos $(n\theta)$, the digital value of the output signal from said further amplitude comparator being dependent upon the sign of cos $(n\theta)$.

12. An electrical system for providing a digital representation of the position of a movable member, comprising: electrical position-encoding apparatus which is arranged to supply electric signals that provide a digital representation of the particular range of a multiplicity of consecutive ranges of position within which said position lies; a variable-reluctance transformer comprising a primary winding, a plurality of secondary windings, and a pair of toothed ferromagnetic cores one of which is mechanically coupled to said member for movement relative to the other core at the same velocity as said member and such as to vary inductive coupling between the primary and secondary windings, there being a multiplicity of cycles corresponding to the multiplicity of teeth on the movable core, of variation of the inductive coupling between the primary and secondary windings throughout said multiplicity of ranges of position; and electrical circuit means for supplying electric signals which are derived in dependence upon the amplitudes of signals appearing in said secondary windings, and which provide a digital representation of said position within any said range.

13. An electrical system according to claim 12 wherein the pitch of the teeth on said cores is different and said secondary windings are positioned with respect to each other so that, owing to the different tooth-pitches of said cores, the cyclic variation of said inductive coupling is of different phase for each secondary winding and wherein said circuit means includes a plurality of amplitude comparators, means to supply a respective pair of signals to each amplitude comparator, means to derive at least one signal of each said pair from at least one of the signals induced in said secondary windings, this one derived signal having an amplitude that varies cyclically through said ranges, and each amplitude comparator being arranged to supply an output signal that is representative of an appropriate one of two digits in accordance with which of said pair of signals is of greater amplitude, the output signals being in combination representative of the position of said movable member within any said range.

14. An electrical system according to claim 12 wherein the variable reluctance transformer comprises a ferromagnetic stator, a ferromagnetic rotor, a series of ferromagnetic teeth on each of the stator and rotor, a primary winding on said stator, a plurality of secondary windings that embrace different groups of teeth of the stator, said rotor being arranged for rotation relative to said stator to vary inductive coupling between the primary winding and each secondary winding, said secondary windings being positioned with respect to each other so that, owing to the different tooth-pitches of said cores, the secondary windings have different inductive couplings with the primary winding, there being a multiplicity of cycles of variation of said inductive coupling when the rotor is rotated through one revolution relative to the stator.

15. An electrical system according to claim 14 wherein the stator and rotor have different numbers of teeth in which numbers two is the only common factor, the primary winding is wound on the stator teeth so that its sense alternates from one stator tooth to the next, and each secondary winding embraces diametrically opposite stator teeth in opposite senses.

16. An electrical system according to claim 15 wherein the variable-reluctance transformer has three secondary windings that are displaced with respect to the stator by 120 degrees from one another around the stator.

17. An electrical system according to claim 16 wherein said circuit means includes a Scott-connected pair of transformers to which the three secondary windings are connected, said transformers providing, in operation, signals having amplitudes that are dependent upon sin $(n\theta)$ and cos $(n\theta)$ respectively, where $n$ is the number of teeth on the rotor and $\theta$ is the angular displacement of the rotor from a datum position relative to the stator.

18. An electrical system according to claim 14 wherein the variable-reluctance transformer has two secondary windings that are effectively displaced by 90 degrees from one another around the stator, the signals induced in these two secondary windings having amplitudes that are dependent upon sin $(n\theta)$ and cos $(n\theta)$ respectively, where $n$ is the number of teeth on the rotor and $\theta$ is the angular displacement of the rotor from a datum position relative to the stator.

19. An electrical system according to claim 12 and including controlling means connected between said circuit means and said position-encoding apparatus whereby an electric controlling signal derived from said circuit means and which has a value that changes concurrently with change in position of the movable member from one to a next of said ranges, is supplied to said position-encoding apparatus, said controlling means being connected to bias said position-encoding apparatus to give a digital representation of the range appropriate to said value of the electric controlling signal rather than of an adjacent range.

20. An electrical system according to claim 12 wherein said position-encoding apparatus includes a position-encoder having a first electrical winding, a plurality of second electrical windings, and a ferromagnetic member mounted for movement relative to the windings and being mechanically coupled to said movable member so as to move relative to the windings at the same velocity as said movable member, the inductive coupling between said first winding and portions of said second windings being increased in the immediate vicinity of said ferromagnetic member and the second electrical windings being so disposed that the combination of inductive couplings in a particular sense of each second winding with the first winding is characteristic of the position of the ferromagnetic member relative to said windings and therefore, of the position of the said movable member.

21. An electrical system for providing a digital representation of the angular position of a shaft, comprising: an electrical shaft-position encoder which has a rotor that is mechanically coupled to said shaft to rotate with, and at the same velocity as, the shaft; electrical circuit means which is arranged to derive from the shaft-position encoder a plurality of electric signals which provide a coarse representation of the angular position of the shaft to the extent that they provide a digital representation of the particular angular range of a multiplicity of equal angular ranges within which the shaft-position lies; a variable-reluctance transformer which comprises a primary winding, a plurality of secondary windings, a toothed ferromagnetic stator, and a toothed ferromagnetic rotor that is mechanically coupled to rotate with, and at the same velocity as, said shaft, the tooth-pitches of the toothed stator and toothed rotor being different and the windings being arranged such that when the toothed rotor is rotated through one revolution there is a multiplicity of cycles of variation of the inductive coupling between the primary and secondary windings, the secondary windings being positioned with respect to each other so that, owing to the different tooth pitches of the cores, the cyclic variation of inductive coupling is of different phase for each secondary winding; and further electrical circuit means for supplying a plurality of electric signals which are derived from signals induced in the secondary windings of the transformer, and which provide a fine representation of the angular position of the shaft to the extent that they provide a digital representation of the angular position of the shaft within the range of which said coarse representation is then representative.

22. An electrical system according to claim 21 and including controlling means connected between said further circuit means and said shaft-position encoder whereby an electric controlling signal is derived from said further circuit means having a value that changes concurrently with change in shaft-position from one to a next of said ranges, the controlling signal being applied to said controlling means to bias said shaft-position encoder to give a digital representation of the range appropriate to said value of the electric controlling signal rather than of an adjacent range.

23. An electrical system according to claim 22 wherein the shaft-position encoder has two input paths and said controlling means applies an input signal to a first of the input paths when said controlling signal has one value and to the second input path when the controlling signal has another value, the input signal being effective in a particular input path, to defer by a small angular rotation of said rotor of said shaft-position-encoder, the change of coarse representation that would otherwise occur at a change of shaft-position from one to a next of said ranges, one set of alternate ones of said ranges undergoing this effective extension of range when the input signal is applied to said first input path and the other set of alternate ones of said ranges undergoing this effective extension of range when the input signal is applied to said second input path so that, the choice of input path being dependent upon said value of said controlling signal which in turn is dependent upon said fine representation of the shaft position, the change of coarse representation is concurrent with a change of fine representation.

References Cited by the Examiner

UNITED STATES PATENTS

| | | | |
|---|---|---|---|
| 2,882,524 | 4/59 | Spencer | 340—347 |
| 2,905,874 | 9/59 | Kelling | 340—347 |
| 2,930,033 | 3/60 | Webb | 340—347 |
| 3,045,230 | 7/62 | Tripp et al. | 340—347 |
| 3,066,286 | 11/62 | Wright | 340—347 |

MALCOLM A. MORRISON, *Primary Examiner.*

WALTER W. BURNS, Jr., *Examiner.*